United States Patent [19]

Podolski et al.

[11] Patent Number: 5,143,741
[45] Date of Patent: Sep. 1, 1992

[54] CONCENTRATED, SUBSTANTIALLY NON-AGGREGATED CASEIN MICELLES AS A FAT/CREAM SUBSTITUTE AND A METHOD FOR REDUCING THE FAT CONTENT IN FOOD PRODUCTS

[76] Inventors: Joseph S. Podolski, 5334 Suffield Ter., Skokie, Ill. 60077; Maher Habib, 356 Walnut St., Des Plaines, Ill. 60016

[21] Appl. No.: 784,112

[22] Filed: Oct. 30, 1991

Related U.S. Application Data

[63] Continuation of Ser. No. 618,008, Nov. 26, 1990, abandoned, which is a continuation of Ser. No. 358,654, Jun. 1, 1989, abandoned, which is a continuation-in-part of Ser. No. 202,082, Jun. 3, 1988, abandoned.

[51] Int. Cl.$^5$ .................. A23C 9/142; A23L 1/19
[52] U.S. Cl. .................. 426/565; 426/564; 426/570; 426/580; 426/587; 426/589; 426/656; 426/804
[58] Field of Search ........... 426/565, 564, 570, 580, 426/587, 589, 656, 804

[56] References Cited

U.S. PATENT DOCUMENTS

| | | | |
|---|---|---|---|
| 1,424,603 | 8/1922 | Turney . | |
| 1,659,723 | 2/1928 | Cosler . | |
| 3,809,764 | 5/1974 | Gabby et al. | 426/163 |
| 3,929,892 | 12/1975 | Hynes et al. | 426/582 |
| 3,995,070 | 11/1976 | Nagasawa et al. | 426/580 |
| 4,260,636 | 4/1981 | Yasumatsu et al. | 426/34 |
| 4,379,170 | 4/1983 | Hettinga et al. | 426/40 |
| 4,400,406 | 8/1983 | Morley et al. | 426/565 |
| 4,462,932 | 7/1984 | Lonergan | 260/119 |
| 4,631,196 | 12/1986 | Zeller | 426/580 |
| 4,689,245 | 8/1987 | Kosikowski et al. | 426/72 |
| 4,734,287 | 3/1988 | Singer et al. | 426/41 |
| 4,840,813 | 6/1989 | Greenberg et al. | 426/565 |
| 4,855,156 | 8/1989 | Singer et al. | 426/565 |

FOREIGN PATENT DOCUMENTS

| | | |
|---|---|---|
| 0186233 | 7/1986 | European Pat. Off. . |
| 0308091 | 3/1989 | European Pat. Off. . |
| 2559034 | 8/1985 | France . |
| 83/00005 | 1/1983 | PCT Int'l Appl. . |
| 85/01421 | 4/1985 | PCT Int'l Appl. . |
| 1273943 | 5/1972 | United Kingdom . |

OTHER PUBLICATIONS

Berger et al., J. Food Technol., 6, 285–294 (1971).
Phoenix Advanced Technology, "Go! Nutritional Information Sheet Webb et al." Fundamentals of Dairy Chemistry, 1974, p. 607.

*Primary Examiner*—Joseph Golian
*Assistant Examiner*—Evan Federman
*Attorney, Agent, or Firm*—John M. Sanders

[57] ABSTRACT

Substantially non-aggregated casein micelles are employed as a fat substitute in food products. The concentrated casein micelles can replace all or a portion of the fat or cream in food products such as frozen dairy desserts, icings, puddings, whipped toppings, fortified skim milk, dips, spreads and sauces.

23 Claims, No Drawings

CONCENTRATED, SUBSTANTIALLY NON-AGGREGATED CASEIN MICELLES AS A FAT/CREAM SUBSTITUTE AND A METHOD FOR REDUCING THE FAT CONTENT IN FOOD PRODUCTS

CROSS-REFERENCE TO RELATED APPLICATIONS

This application is a continuation of application Ser. No. 07/618,008, filed Nov. 26, 1990 now abandoned, which is a continuation of application Ser. No. 07/358,654, filed Jun. 1, 1989 now abandoned which is a continuation-in-part (C-I-P) of U.S. Ser. No. 07/202,082, filed Jun. 3, 1988, now abandoned which is incorported herein by reference.

BACKGROUND OF THE INVENTION

The present invention relates to protein materials used as fat or cream substitutes. In particular, concentrated, substantially non-aggregated, casein micelles are employed as fat substitutes and can replace all or a portion of fat or cream in fat/cream containing foods having a pH greater than about 5.6. Additionally, the present invention relates to a method reducing the fat content of these foods and compositions containing concentrated casein micelles as a fat substitute.

Casein micelles are naturally occurring proteinaceous microparticles found in milk and contribute to the turbidity or white color of milk. They generally have a spheroidal shape and a diameter of from about 0.1 to 0.4 microns ($\mu$). Casein is employed as a stabilizing agent for fat emulsions. Casein micelles are pH sensitive and coagulate at a pH under about 5.1 to form cheese. Skim milk contains casein in an amount of about 3.2% by weight of which 80–97% are in the micellar form. (See Fundamentals of Dairy Chemistry, 2nd Edition, Webb et al., eds., The AVI Publishing Co., Inc., Westport, CT., page 607, 1974.) Skim milk also contains about 4.8% by weight lactose (about 52% by weight of the milk solids). In frozen dairy products, such as ice cream, lactose is undesirable in concentrations greater than about 6% because it crystallizes and contributes a sandy mouthfeel.

U.S. Pat. No. 4,631,196 to Zeller discloses non-fat dairy products containing (1) water, (2) skim milk or cultured skim milk, (3) a mixture of polydextrose and sucrose, (4) milk solids, and (5) stabilizers/emulsifiers.

U.S. Pat. No. 4,689,245 to Kosikowski et al. discloses a low-fat dairy coffee whitener. The coffee whitener is made from (1) decreamed milk ultrafiltration retentate having its protein concentrated between 2:1 to 4:1 compared to the protein content of the starting milk, and (2) riboflavin and/or beta carotene as a whitening enhancer.

U.S. Pat. No. 4,734,287 to Singer et al. discloses a proteinaceous, water dispersible macrocolloid having a smooth, emulsion-like organoleptic character when hydrated. The macrocolloid comprises substantially non-aggregated particles of denatured dairy whey protein having a mean diameter particle size distribution in a dried state ranging from $0.1\mu$–$2.0\mu$ with less than about 2 percent of the total number of particles exceeding $3.0\mu$ in diameter. Singer et al. employ the denatured dairy whey macrocolloid as a fat substitute.

It has been unexpectedly discovered that concentrated, substantially non-aggregated, casein micelles can act as a fat substitute.

SUMMARY OF THE INVENTION

In accordance with the present invention, concentrated, substantially non-aggregated, casein micelles are used as a fat, cream or oil substitute. Concentrated substantially non-aggregated casein micelles are added to frozen desserts in amounts of at least about 6% by weight of the frozen dessert and contribute a fat-like mouthfeel to the food. All or a portion of the fat normally in the dessert can be removed. Additional food products in which fat, cream or oil can be replaced by concentrated substantially non-aggregated casein micelles include icings, puddings, whipped toppings, fortified skim milk, dips, spreads and sauces which have a pH over about 5.6.

Of particular interest are frozen dessert products wherein, for example, ultrafiltered skim milk is added to an ice cream formulation in lieu of the cream to provide a final casein micelle concentration of at least about 6 percent by weight of the ice cream and preferably at least 7 or 8 weight percent. The resulting product is substantially fat free and has the creaminess, i.e., sensory perception, of a premium full fat ice cream, i.e., one having a fat content of 8–16%.

In fortified skim milk products according to the invention, casein micelles are added to skim milk in an amount sufficient to bring the casein micelle concentration to at least about 1.5 times the normal casein micelle concentration of about 2.3% (i.e., to provide a casein micelle concentration of at least about 3.5%). In the other food products, casein micelles are employed in amounts of at least about 4 weight percent of the food product, usually at least about 5% and preferably at least about 6%.

DETAILED DESCRIPTION OF THE INVENTION

In practicing the present invention, substantially non-aggregated casein micelles are employed as a fat or cream substitute in creamy food systems having a pH over about 5.6. The exact amount of casein micelles will vary depending on the particular food product and the amount of fat being replaced. For example, the casein micelle concentration should be greater than about 6 percent by total weight of whipped and quiescently frozen dessert products and will usually be between about 7 and about 12 weight percent. Preferably, the casein content is between 8-12 weight percent. However, in the case of fortified skim milk, a total casein concentration of at least about 1.5 times that normally present in skim milk is acceptable. The normal casein micelle concentration in skim milk is about 2.3 percent by weight. In icings, puddings, whipped toppings, dips, spreads and sauces having a pH $>5.6$, the casein micelle concentration must be at least about 4 weight percent, usually 5 weight percent and preferably over 6 weight percent. Provisions of substantially non-aggregated casein micelles in concentrations according to the present invention imparts a fat or creamy mouthfeel to foods. The non-aggregated casein micelles can replace all or a portion of the fat or cream in creamy foods.

Suitable creamy food products include whipped or quiescently frozen or refrigerated desserts such as ice cream-like frozen dairy desserts (ice cream analogs), puddings, whipped toppings and mousses as well as icings, fortified skim milk, milk shake type beverages, dips, spreads and sauces. These food products must have a pH greater than about 5.6. A pH under about 5.6 will cause aggregation of the casein micelles, i.e., cheese. The non-aggregated casein micelles are added to the food products as a replacement for all or a portion of the fat/cream normally present in the food product. Usually the casein micelles are substituted for the fat or cream in the food manufacturing process wherever fat is called for.

The substantially non-aggregated casein micelles are found naturally in mammalian milk. Preferably, cow's milk is the source of the casein because casein is the predominant protein of cow's milk (80% of total protein). Between 80-97% of the casein is in micellar form. All milk sources containing non-aggregated casein which are added to a food product will contribute towards achieving the desired casein concentration. Casein sources include skim milk, whole milk, 2% milk, condensed skim milk, ultrafiltered whole milk and ultrafiltered skim milk. Skim milk contains about 3.6% protein of which 80% is casein. Once skim milk is cooled, then about 80% of the casein is in micellar form, i.e., about 2.3% of the skim milk is micellar casein.

A preferred source of non-aggregated casein micelles is ultrafiltered (UF) skim milk which has been reduced in volume at least about 4 times; i.e., $4\times$ UF skim milk. Preferred UF skim milk is $6\times$ or $8\times$ UF skim milk. Ultrafiltration techniques are well known in the art. Standard commercially available ultrafiltration (UF) membranes are employed. These membranes pass water, lactose and other soluble milk components but retain milk proteins and, optionally, fat in the retentate. The retentate contains the non-aggregated casein micelles and is used as the preferred casein source according to the present invention. A membrane having a rating of about 10,000 Daltons will retain proteins and fat. Larger rated membranes on the order of 100,000 Daltons or more can also be employed which will retain certain proteins but allow others to pass. Ultrafiltration techniques are described in Kosikowski et al., U.S. Pat. No. 4,689,245 and ULTRAFILTRATION AND REVERSE OSMOSIS FOR THE DAIRY INDUSTRY, F. A. GLOVER, NATIONAL INSTITUTE FOR RESEARCH IN DAIRYING, Reading, England, Technical Bulletin No. 5, 1985, both of which are incorporated herein by reference.

Diafiltration techniques can also be employed to further reduce salt and lactose levels in the UF skim milk. Diafiltration techniques are well known to one skilled in the art and basically involve (a) adding water to a UF skim milk retentate to dilute the soluble components, i.e., salt, lactose, and (b) then ultrafiltering this diluted retentate further. The resulting diafiltered UF skim milk product will have lower salt and lactose levels compared to UF skim milk which has not been diafiltered.

In a preferred embodiment, skim milk is ultrafiltered to about 4-9 times its initial volume employing a 10,000 Dalton membrane. The resulting UF skim milk retentate can then optionally be brought back to its original volume by the addition of water and then ultrafiltered to 4-9 times the diluted volume, i.e., diafiltration. The UF skim milk or the diafiltered skim milk is added to food products in amounts to provide a non-aggregated casein micelle concentration which imparts a creamy mouthfeel to the food, i.e., fat substitute. UF skim milk and diafiltered skim milk can be used fresh or can be stored under refrigeration and used at a later date. When refrigerated, UF skim milk concentrates of $6\times$ or more will form a reversible gel.

In preparing a low or no-fat frozen dairy dessert (ice cream analog), standard ice cream manufacturing techniques are employed with the exception that concentrated non-aggregated casein micelles (>6% wt) are employed instead of the usual amounts of cream (8-16%). Usually, UF skim milk or diafiltered skim milk will provide a major portion of the casein. Other milk components such as condensed skim milk, skim milk, and non-fat milk solids, will also contribute to the minimum 6% casein micelles concentration. A typical frozen dairy dessert will contain:

| Ingredient | Amount (Wt. %) |
|---|---|
| Sugar | 10-20 |
| Stabilizers | 0-1.0 |
| Ultrafiltered milk protein | 3.7-10.2 |
| Egg yolk | 0-3 |
| Corn syrup solids | 0-5 |
| Starch | 0-1 |
| Milk solids, non-fat | 6-12 |
| Water content | 60-70 |

The frozen dairy desserts of the present invention are prepared by blending all of the dry ingredients and then uniformly dispersing them throughout a mixture of the liquid ingredients. It is not critical how this dispersion is achieved. One method is to combine the liquid or wet ingredients in a LIQUIVERTER liquifier and then slowly add the dry blended ingredients into the vortex of the liquid mixture. A frozen dairy dessert mix is made first which contains all ingredients except the flavors. This mix is then pasteurized according to standard continuous or batch pasteurization techniques, i.e., 155° F. for ½ hour, 175° F. for 25 seconds or 190° F. for 4 seconds. High temperature, short residence time pasteurization is preferred because a less cooked flavor results under these conditions.

The pasteurized mix is cooled and the flavors are usually added when the mix reaches about ambient temperature. The flavored frozen dairy dessert mix is then frozen. Usually, air is added during the freezing of the flavored mix, i.e., overrun. Overrun of 50-100% by volume are usually employed although more or less air can be added to the mix if desired. Overruns of between 50 and 75% are preferred.

The frozen dairy desserts of the present invention possess the mouthfeel characteristic of a full fat ice cream with little or no fat/cream. The present frozen dairy desserts can optionally contain egg yolk for flavor and starch for enhanced texture. The frozen dairy dessert can be blended with milk to make milk shake-type beverages.

A fortified skim milk product having the mouthfeel of whole milk is preapred by adding to skim milk a casein micelle source which brings the casein micelle concentration to at least about 1.5 times that normally present in skim milk, i.e., a casein micelle concentration of at least about 3.5%. Higher casein micelle concentrations will provide a creamier milk analog product. Advantageously, casein micelle concentrations greater than about 4 or 5% are preferred.

Dips, spreads, sauces and icings having a pH greater than about 5.6 are prepared by adding a casein micelle source for the fat or cream normally present in the traditional food product. The casein micelle source is employed in amounts to achieve a casein micelle concentration of at least about 5% by weight of the food product, advantageously at least about 5% by weight and preferably 6-8% by weight. A minor amount of the fat or cream can optionally be retained in the food product. For example, butter-type spreads can be prepared by employing up to about 40% by weight butter oil in the spread.

The following examples illustrate the practice of the present invention but should not be construed as limiting its scope. The lactose levels given in the examples below were determined by estimating the known lactose levels in skim milk, and extrapolation to UF skim milk and diafiltered skim milk and were not done by chemical analysis.

EXAMPLE 1

Frozen Dairy Dessert

A substantially fat-free frozen dairy dessert was made wherein the casein concentration was 7.44% by weight of the final dairy product. Standard ice cream ingredients and ice cream making procedures were employed except no cream was used. Two sources for non-aggregated casein were employed.

(1) Non-Fat Dry Milk (NFDM); and
(2) Ultra Filtered (UF) skim milk (6×).

NFDM contributed 0.7% protein and UF skim milk contributed 8.6% protein for a total protein content of 9.3% by weight of which 80 percent was casein, i.e., total casein concentration of 7.44%. The stabilizers (gums) used in this fat-free dairy dessert were xanthan (0.02%), locust bean gum (0.05%) and carrageenan (0.07%). This fat-free frozen dairy dessert tasted dairy-like and had a creamy texture. Regular ice cream containing 12% non-fat milk solids contains about 4.3% total protein, i.e., 3.4% by weight casein.

EXAMPLE 2

Ultrafiltration of Skim Milk

For Use in a Frozen Dairy Dessert

Twenty (20) gallons (gal.) of skim milk was ultra filtered down to a volume of about 4 gal. Analysis (wt. %) of the starting skim milk, and the resulting concentrate is given below:

| Component | Skim Milk (%) | Concentrate (%) |
|---|---|---|
| Fat | 0.1 | 0.444 |
| Protein | 3.6 | 15.98 |
| Lactose | 5.1 | 5.1 |
| Ash | 0.7 | 0.7 |
| Water | 90.5 | 0 |
| Total Solids | 9.5 | 22.22 |

This UF skim milk was used to make a frozen dairy dessert. All the ingredients are listed below:

| Ingredient | Weight (gm) | Solids (gm) |
|---|---|---|
| UF skim milk | 1640 | 364.0 |
| Sugar | 320 | 320.0 |
| NFDM | 40 | 40.0 |
| Whole egg (1.5%) | 56 | 36.4 |
| Gum | | |
| xanthan | 0.4 | 0.4 |
| locust bean | 1.0 | 1.0 |
| carrageenan | 1.5 | 1.5 |
| Flavors | | |
| cream flavor | 0.41 | — |
| VANIQUE vanilla | 2.46 | — |

| Ingredient | Weight (gm) | Solids (gm) |
|---|---|---|
| 4× Bourbon | 4.11 | — |

The above ingredients were mixed, pasteurized, cooled, flavored and frozen in a Taylor Freezer for 10-15 minutes to a drum temperature of 18° F. The flavors were added during the cooling period. The resulting product had a creamy texture like regular full fat ice cream.

EXAMPLE 3

Frozen Dairy Dessert

A fat-free ice cream-like frozen dairy mix was prepared employing the following ingredients:

| Ingredient | Description |
|---|---|
| Keltose ™ alginate | Lot 32020A |
| Locust bean gum | Hi-Tec Polymers |
| Carrageenan | Marine Colloids Seakem CM 614 |
| Guar | Uniguar 250 |
| Sugared egg yolk | Waldbaum sugared yolk |
| Corn syrup solids | Star-Dri Lot BO 71722HH |
| Sugar | Cane sugar |
| Condensed skim milk | Great Lakes Milk (29.79% solids) |
| UF skim milk | 26.9% solids (4% lactose) |
| Water | Tap |

The concentration of ingredients was:

| Ingredient | Weight (gm) | Wt. % | Solids |
|---|---|---|---|
| Keltose alginate | 7.2 | 0.12 | 7.2 |
| Locust bean gum | 3.0 | 0.05 | 3.0 |
| Carrageenan | 4.5 | 0.08 | 4.5 |
| Guar | 2.2 | 0.04 | 2.2 |
| Sugared yolk | 54 | 0.9 | 27.0 |
| Corn syrup solids | 180 | 3.0 | 180.0 |
| Sugar | 780.0 | 13.0 | 780 |
| Condensed skim milk | 1596.0 | 26.5 | 475.4 |
| | | | (~247.2 gm lactose) |
| UF skim milk | 2142.0 | 35.7 | 576.2 |
| | | | (~86.68 gm lactose) |
| Water | 1231.1 | | 0 |
| Total | 6000 gm | | 2055.5 = 34.3% |

All of the dry ingredients were blended together. The water, yolk, UF skim milk and corn syrup solids were then added to it with mixing. This mixture was heated in a double boiler with stirring to 157° F. and held at about this temperature for 30 minutes. The maximum temperature reached was 162° F. The mix was blended and cooled to room temperature and flavored and frozen in a Taylor freezer. The product had a creamy texture like full fat ice cream.

EXAMPLE 4

Frozen Dairy Product

A fat-free ice cream-like dairy mix was prepared with the following ingredients:

| Ingredient | Weight (gm) | Wt. % | Solids | Lactose (gm) |
|---|---|---|---|---|
| Keltose alginate | 12 | 0.12 | 12 | |
| Locust bean gum | 5 | 0.05 | 5 | |
| Carrageenan | 8 | 0.08 | 8 | |
| Guar | 4 | 0.04 | 4 | |
| Yolk | 90 | 0.9 | 45 | |

-continued

| Ingredient | Weight (gm) | Wt. % | Solids | Lactose (gm) |
|---|---|---|---|---|
| Corn syrup solids | 300 | 3.0 | 300 | |
| Sugar | 1300 | 13.0 | 1300 | |
| Condensed Skim Milk (30.33% solids) | 3131 | 31.31 | 949.6 | 496.5 |
| UF Skim Milk (29.73% solids) | 2611 | 26.11 | 776.3 | 103.4 |
| Water | 2539 | 25.39 | | |
| Totals | 10,000 | 100.00 | 3,399.9 | 599.9 |

All dry ingredients were blended together followed by addition of the liquid ingredients with mixing. This mixture was heated in a double boiler to 145° F. for ½ hour. A 2,000 gm batch of this mix was flavored by mixing in a 0.6% by weight 4× FMC bourbon Vanilla, 0.22% L80-50 and 0.01% Cream starter distillate. This flavored mix was then frozen. The resulting ice cream-like frozen diary dessert was creamy like full fat ice cream.

EXAMPLE 5

Frozen Dairy Dessert

A fat-free ice cream-like frozen dairy product was prepared employing substantially the same procedures and ingredients described in Example 4 with the exception that corn syrup solids were not used and the total protein was 12.6%, i.e., 9.6% protein from UF skim milk, and 3.0% protein from condensed skim milk. This product had a casein micelle concentration of 10.08% and had a creamy texture like full fat ice cream.

EXAMPLE 6

Frozen Dairy Dessert

A fat-free ice cream-like frozen dairy product was prepared employing substantially the same procedure described in Example 5 except that the sugar concentration was increased to 14.0% and the protein concentration was 11.5%. The casein concentration was 9.2%. The resulting frozen dairy product had a creamy texture like full fat ice cream.

EXAMPLE 7

Frozen Dairy Dessert

The following ingredient were used to prepare fat-free ice cream-like product:

| Ingredient | Wt. (gm) | Solids (gm) |
|---|---|---|
| Keltose alginate | 3.6 | 3.6 |
| Locust bean gum | 1.5 | 1.5 |
| Carrageenan | 2.4 | 2.4 |
| Guar | 1.2 | 1.2 |
| Egg yolk | 27.0 | 13.5 |
| Sugar | 390.0 | 390.0 |
| Condensed skim milk (29.73% solids) | 861.0 | 256.0 |
| UF skim milk (29.73% solids) | 1184.0 | 352.0 |
| Water | 529.0 | 0 |
| Totals | 2999.7 | 1020.20 |

The dry ingredients were mixed and blended into the liquid ingredients. This mixture was heated to 157° F. in a double boiler and held at that temperature for ½ hour. This formulation contained about 179 grams of lactose. The mixture was cooled and flavors were added. The resulting frozen product had a texture like full fat ice cream.

EXAMPLE 8

Frozen Dairy Dessert

A substantially fat-free frozen dessert was prepared according to the procedures described above and included the following ingredients:

| Ingredient | Wt. (lb) | Solids (lb) |
|---|---|---|
| Keltose alginate | 0.313 | 0.313 |
| Locust bean gum | 0.131 | 0.131 |
| Carrageenan | 0.208 | 0.208 |
| Guar | 0.104 | 0.104 |
| Yolk | 2.35 | 1.17 |
| Sugar | 36.5 | 36.5 |
| Condensed skim milk | 80.7 | 23.97 |
| UF skim milk | 82.6 | 26.15 |
| Water | 52.6 | 0 |
| Totals | 260.5 | 88.54 |

The above frozen dairy dessert mix was pasteurized, flavored and frozen. The resulting product had a mouthfeel like a full-fat ice cream and contained 5.99% lactose.

EXAMPLE 9

Starch Modified Formulation

Starch was added to the frozen dairy dessert formulations of the present invention to enhance the texture of the product. The following ingredients were used to prepare such a formulation:

| Ingredient | Wt. (lb) | Solids (lb) |
|---|---|---|
| Keltose alginate | 1.2 | 1.2 |
| Locust bean gum | 0.5 | 0.5 |
| Carrageenan | 0.8 | 0.8 |
| Guar | 0.4 | 0.4 |
| Yolk | 9.0 | 4.5 |
| Sugar | 140.0 | 140.0 |
| Starch | 5.0 | 5.0 |
| Condensed skim milk | 313.7 | 96.61 |
| UF skim milk | 278.7 | 91.97 |
| Water | 250.7 | 0 |
| Totals | 1,000.0 | 340.98 |

The above formulation contained about 6% lactose and was pasteurized, flavored and frozen. The resulting product had a very good ice cream-like texture.

EXAMPLE 10

Whole Egg Formulation

Whole eggs were used in a frozen dessert formulation of the present invention. The ingredients are listed below:

| Ingredient | Wt. (gm) | Solids (gm) |
|---|---|---|
| Keltose alginate | 1.2 | 1.2 |
| Locust bean gum | 0.5 | 0.5 |
| Carrageenan | 0.8 | 0.8 |
| Guar | 0.4 | 0.4 |
| Whole egg | 22.5 | 6.12 |
| Sugar | 140.0 | 140.0 |
| Condensed skim milk | 313.7 | 95.61 |
| UF skim milk | 278.7 | 91.97 |

The above formulation contained about 6% lactose and was pasteurized, flavored and frozen. The resulting product had a creamy ice cream-like texture.

EXAMPLE 11

Double Egg Yolk Formulation

A double egg yolk formulation of the present invention was prepared employing the following ingredients:

| Ingredient | Wt. (gm) | Solids (gm) |
|---|---|---|
| Keltose alginate | 1.2 | 1.2 |
| Locust bean gum | 0.5 | 0.5 |
| Carrageenan | 0.8 | 0.8 |
| Guar | 0.4 | 0.4 |
| Yolk | 18.0 | 9.0 |
| Sugar | 140.0 | 140.0 |
| Condensed skim milk | 313.7 | 95.61 |
| UF skim milk | 278.7 | 91.97 |
| Water | 246.7 | 0 |
| Totals | 1,000.0 | 339.48 |

The above frozen dairy mix had about 6% lactose and was pasteurized, flavored and frozen. The resulting product had the mouthfeel of a full fat ice cream. However, this double egg yolk formulation had a higher fat content.

EXAMPLE 12

Potato Starch Modified

Low Fat Frozen Dairy Dessert

The following two formulations were prepared as frozen dessert mixes and included potato starch sugar:

| Ingredient | Wt. (gm) | Solids (gm) |
|---|---|---|
| Formulation 1 | | |
| Keltose alginate | 1.2 | 1.2 |
| Locust bean gum | 0.5 | 0.5 |
| Carrageenan | 0.8 | 0.8 |
| Guar | 0.4 | 0.4 |
| Yolk | 10.0 | 5.0 |
| Sugar | 140.0 | 140.0 |
| Potato starch sugar | 10.0 | 10.0 |
| Condensed skim milk | 218.7 | 63.3 |
| UF skim milk | 616.0 | 116.9 |
| Water | 2.4 | 0 |
| Totals | 1,000.00 | 338.1 |
| Formulation 2 | | |
| Keltose alginate | 1.2 | 1.2 |
| Locust bean gum | 0.5 | 0.5 |
| Carrageenan | 0.8 | 0.8 |
| Guar | 0.4 | 0.4 |
| Yolk | 10.0 | 5.0 |
| Sugar | 140.0 | 140.0 |
| Potato starch sugar | 5.0 | 5.0 |
| Condensed skim milk | 205.4 | 61.4 |
| UF skim milk | 662.5 | 125.7 |
| Water | 0 | 0 |
| Totals | 1,025.8 | 340.0 |

The above ingredients were blended together, heated to 157° F. for ½ hour and then cooled in a freezer. Flavors were then added to the mixes with mixing before the mixtures were frozen. The resulting frozen dairy desserts had a creamy, ice cream-like texture. However, there was a funny off-flavor in both formulations presumably due to the potato starch augar.

EXAMPLE 13

Scraped Surface Head Exchanger Pasteurization

The following frozen dairy mix was made:

| Ingredient | Wt. (lb.) | Solids (lb.) |
|---|---|---|
| Keltose alginate | 0.12 | 0.12 |
| Locust bean gum | 0.05 | 0.05 |
| Carrageenan | 0.08 | 0.08 |
| Guar | 0.04 | 0.04 |
| Yolk | 1.0 | 0.5 |
| Sugar | 14.0 | 14.0 |
| Starch | 1.0 | 1.0 |
| Condensed skim milk | 36.9 | 10.49 |
| UF skim milk | 28.0 | 7.19 |
| Water | 18.8 | 0 |
| Totals | 99.99 | 33.47 |

The above ingredients were blended and than pasteurized in a scraped surface heat exchanger. Various aliquots of the above 100 pound batch were flavored as follows and frozen:

| Aliquot | Flavor | |
|---|---|---|
| | Quest (Wt. %) | Vanilla (Wt. %) |
| 1 | 0.05 | 0.7 |
| 2 | 0.10 | 0.7 |
| 3 | .05 | 1.0 |
| 4 | 0.10 | 1.0 |
| 5 | 0.05 | 1.4 |
| 6 | 0.10 | 1.0 |
| 7 | 0.20 | 0.52 |

All of the above flavored frozen dairy dessert aliquots had a texture like full-fat ice cream.

EXAMPLE 14

Stabilizer Formulations

Four (4) formulations of frozen dairy desserts were made containing (1) substantially non-aggregated casein micelles (UF skim milk) as a fat substitute, (2) 0.01% egg yolk, (3) 14% sugar, (4) flavors, and (5) the stabilization systems described below in weight percent of final product.

| Gum Component | Stabilizer Formula | | | |
|---|---|---|---|---|
| | 1 | 2 | 3 | 4 |
| Keltose alginate | 0.12 | 0.12 | 0.27 | 0.25 |
| Locust bean gum | 0.05 | 0.05 | 0.25 | 0.10 |
| Carrageenan | 0.08 | 0.08 | 0.10 | 0.10 |
| Guar gum | 0.04 | 0.30 | 0.25 | 0.25 |

All formulations had a texture like full-fat ice cream with the formulation containing Stabilizer Formula 1 being preferred.

EXAMPLE 15

Diafiltered UF Skim Milk

As A Casein Micelle Source

Skim milk was ultrafiltered (10,000 Dalton filter, i.e., AMICON wide channel membrane P-10 DD 1118502) to a 6-fold concentration (6:1 volume reduction or 6×). Five volumes of water were added to the retentate and the diluted retentate was ultrafiltered at 6:1 volume reduction. This diafiltered UF skim milk was then used to prepare the following frozen dairy dessert mix:

| Ingredient | Weight (lb) |
|---|---|
| Condensed skim milk (29.52% solids) | 640.0 |
| Diafiltered UF skim milk (30.3% solids) | 496.0 |
| Skim milk (8.71% solids) | 706.0 |
| Sugar | 308.0 |
| Corn starch (MIRAGEL 463) | 22.0 |
| Sugared egg yolk | 22.0 |
| Alginate (KELTOSE) | 2.64 |
| Carrageenan (SEAKEM CM614) | 1.76 |
| Locust bean gum (MEYPRODINE 200) | 1.1 |
| Guar gum | 0.88 |

A pre-blend of all of the Alginate, carrageenan, locust bean gum, guar gum and starch and 108 lb. of the sugar was prepared by admixing these dry ingredients. A Liquivertor ™ liquifier was charged with all of the condensed skim milk, dialfiltered UF skim milk and skim milk and mixed. The pre-blend was slowly added to the liquifier vortex. The balance of the sugar (200 lb.) was added to the liquifier followed by the addition of the egg yolk. The mixture was blended for 15-20 minutes. The resulting mixture had a pH of 6.39 and a density of 1.15 gm/cc. This mixture was pasteurized at 176° F. for 25 seconds. After pasteurization the mixture was flavored with BECKS vanilla (0.7% total weight) and QUEST cream 8760084 (0.05% total weight). The flavored mix was frozen. The frozen dairy dessert had a texture like a full fat ice cream.

EXAMPLE 16

Freezer Stability

The frozen dairy desserts of Examples 1-15 were hardened to −20° C. and they retained their creamy texture when eaten at ice cream serving temperature (0°-10° F.). The formulation of Example 6 was held for three months at −20° F. and had a creamy texture when thawed and eaten at 0°-10° F.

EXAMPLE 17

Fortified Skim Milk

A fortified skim milk was prepared by mixing 69 parts by weight skim milk and 31 parts by weight 4× UF skim milk having a solids content of 20.3%. The flavor and texture of the fortified skim milk was improved over regular skim milk. The fortified skim milk was used to make hot chocolate and tasted superior to hot chocolate made from whole milk.

EXAMPLE 18

Milk Shake Mix

The following ingredients are mixed to form a milk shake mix:

| | % |
|---|---|
| UF skim milk (6× or 8×) | 14.0 |
| HFCS 55 | 6.5 |
| 36 DE corn syrup | 3.00 |
| Stabilizer, emulsifier | 0.24 |
| Skim milk | 40.00 |
| Water | 36.26 |
| | 100.00% |

EXAMPLE 19

Chocolate Mousse

The following ingredients are mixed to form a chocolate mousse:

| | % |
|---|---|
| Milk protein hydrolysate | 2.0 |
| Carrageenan | 1.0 |
| Instant starch | 1.0 |
| Sugar | 8.5 |
| Cocoa | 2.5 |
| NFDM | 3.0 |
| UF skim milk (6× or 8×) | 14.0 |
| Water | 28.00 |
| Skim milk | 40.00 |
| | 100.00% |

EXAMPLE 20

Whipped Topping

The following ingredients are mixed to form a whipped topping. Flavors and coloring are added as desired:

| | % |
|---|---|
| Milk protein isolate | 1.56 |
| Milk protein hydrolysate | 0.20 |
| Sucrose | 12.00 |
| Dextrose | 0.60 |
| Stabilizers | 0.10 |
| Water | 38.84 |
| Emulsifiers | 0.70 |
| Flavors and colors | optional |
| UF skim milk (6× or 8×) | 26.00 |
| Skim milk | 20.00 |
| | 100.00% |

EXAMPLE 21

Butter Spread

The following ingredients are mixed to form a butter type spread:

| | % |
|---|---|
| Butter oil | 30.00 |
| UF skim milk (6× or 8×) | 67.50 |
| Emulsifier | 1.50 |
| Flavor | 1.00 |
| | 100.00% |

EXAMPLE 22

White Sauce

A white sauce is prepared by mixing the following ingredients:

| | % |
|---|---|
| UF skim milk (6× or 8×) | 15.00 |
| Modified waxy maize starch | 4.20 |
| Maltrin M100 | 7.00 |
| Salt | 0.70 |
| Butter flavor | 0.10 |
| Color | optional |
| Water | 33.00 |
| Skim milk | 40.00 |

-continued

| | % |
|---|---|
| | 100.00% |

In further embodiments, non-aggregated casein micelles are added to icings, puddings, sauces, dips, whipped toppings and spreads as a total or partial fat/cream substitute whereby the resulting food products have the texture and mouthfeel of their full-fat counterparts.

What is claimed is:

1. A method for reducing fat or cream in a whipped or quiescently frozen or refrigerated dessert containing the same which comprises substituting all or a portion of the fat or cream with substantially non-aggregated casein micelles wherein the casein micelles are present in the whipped or quiescently frozen or refrigerated dessert in an amount of at least about 6 percent by total weight.

2. The method of claim 1 wherein the casein micelle concentration is at least about 7 percent by weight of the dessert.

3. The method of claim 2 wherein the casein micelle concentration is between about 8 and 12 percent by weight of the dessert.

4. The method of claim 2 wherein the dessert is a frozen dairy dessert.

5. The method of claim 2 wherein the dessert is a mousse, pudding or whipped topping.

6. The method of claim 1 wherein a major portion of the non-aggregated casein micelles are provided by ultrafiltered skim milk or diafiltered skim milk.

7. An low-fat or no fat frozen dairy dessert which comprises:
   (a) at least about 6 weight percent of substantially non-aggregated casein micelles;
   (b) a sweetener;
   (c) flavors;
   (d) stabilizers; and
   (e) water.

8. The frozen dairy dessert of claim 7 wherein the casein micelle concentration is at least about 7 weight percent.

9. The frozen dairy dessert of claim 8 wherein the casein micelle concentration is between about 8 and 12 weight percent.

10. The frozen dairy dessert of claim 8 further comprising:
    (f) starch, and
    (g) egg yolk.

11. The frozen dairy dessert of claim 10 wherein a major portion of the non-aggregated casein micelles are provided by ultrafiltered skim milk or diafiltered skim milk.

12. In a dip, spread, sauce or icing food product which contains fat or cream and has a pH greater than about 5.6, the improvement which comprises substituting all or a portion of the fat or oil with substantially non-aggregated casein micelles wherein the casein micelles are present in the food product in an amount of at least about 4 weight percent.

13. The improved food product of claim 12 wherein the concentration of non-aggregated casein micelles is at least about 5 weight percent.

14. The improved food product of claim 13 wherein a major portion of the non-aggregated casein micelles is provided by ultrafiltered skim milk or diafiltered skim milk.

15. The improved food product of claim 14 wherein the casein micelle concentration is between about 6 and 12 weight percent.

16. The improved food product of claim 15 wherein the food product is a spread.

17. The improved food product of claim 13 wherein the food product is an icing.

18. A low fat frozen dairy dessert comprising:

| Ingredient | Amount (Wt. %) |
|---|---|
| Sugar | 10–20 |
| Stabilizers | 0–1.0 |
| Ultrafiltered milk protein | 3.7–10.2 |
| Egg Yolk | 0–3 |
| Corn Syrup Solids | 0–5 |
| Starch | 0–1 |
| Milk Solids, non-fat | 6–12 |
| Water Content | 60–70 | wherein said milk protein and non-fat milk solids together provide a concentration of at least 6 weight percent of substantially non-aggregated casein micelles.

19. A method for reducing the fat or oil in an icing, dip, spread or sauce containing the same which comprises substituting the fat or oil with substantially non-aggregated casein micelles wherein the casein micelles are present in the icing, dip, spread or sauce in an amount of at least 4 weight percent.

20. A process for fortifying skim milk to provide the mouthfeel of whole milk, said process consisting essentially of adding substantially non-aggregated casein micelles thereto in an amount sufficient to provide therein a total of at least 1.5 times the concentration of casein micelles originally present in the skim milk prior to fortification.

21. The process of claim 20 wherein said substantially non-aggregated casein micelles are added to provide a total casein micelle concentration of at least about 3.5 weight percent.

22. The process of claim 21 wherein said substantially non-aggregated casein micelles are added to provide a total casein micelle concentration of at least about 5 weight percent.

23. The process of claim 21 wherein said substantially non-aggregated casein micelles are added to provide a total casein micelle concentration of at least about 6 weight percent.

* * * * *